J. C. J. DE LESTANG-PARADE.
AUTOMATIC REGULATOR FOR THE DISTRIBUTION OF PREDETERMINED QUANTITIES OF GAS UNDER VARIABLE ATMOSPHERIC PRESSURES.
APPLICATION FILED NOV. 15, 1917.

1,434,103.

Patented Oct. 31, 1922.
2 SHEETS—SHEET 1.

Inventor:
Jacques Charles Joseph de Lestang-Parade
per H. W. Plucker
Attorney.

J. C. J. DE LESTANG-PARADE.
AUTOMATIC REGULATOR FOR THE DISTRIBUTION OF PREDETERMINED QUANTITIES OF GAS UNDER VARIABLE ATMOSPHERIC PRESSURES.
APPLICATION FILED NOV. 15, 1917.

1,434,103.

Patented Oct. 31, 1922.
2 SHEETS—SHEET 2.

Inventor:
Jacques Charles Joseph de Lestang-Parade
per H. W. Plucker
Attorney.

Patented Oct. 31, 1922.

1,434,103

UNITED STATES PATENT OFFICE.

JACQUES CHARLES JOSEPH DE LESTANG-PARADE, OF PARIS, FRANCE.

AUTOMATIC REGULATOR FOR THE DISTRIBUTION OF PREDETERMINED QUANTITIES OF GAS UNDER VARIABLE ATMOSPHERIC PRESSURES.

Application filed November 15, 1917. Serial No. 202,260.

*To all whom it may concern:*

Be it known that I, JACQUES CHARLES JOSEPH DE LESTANG-PARADE, of 94 Rue Amelot, Paris, France, manufacturer, have invented an Automatic Regulator for the Distribution of Predetermined Quantities of Gas Under Variable Atmospheric Pressures, of which the following is a full, clear, and exact description.

The present invention relates to an automatic regulator permitting of the distribution of predetermined quantities of gas under variable pressures of an extraneous medium such as the atmosphere.

This apparatus is more particularly applicable to aerial navigation, to enable aviators or aeronauts to combat the effects of the lowering of the pressure of the atmosphere.

It is known that in proportion as one rises through the atmosphere the pressure of the latter decreases, which occasions, in the human organism, serious troubles, capable, in the event of the height attained being too considerable, of causing death.

In order to combat the effects of this reduction in pressure, oxygen in the form of inhalations has already been utilized and various devices have been contrived for the purpose of distributing this gas.

Nevertheless the working of such apparatus is subordinate to the will of the aviator or aviators in the aerial machine, that is to say, the oxygen-distributing apparatus has to be actuated by the said aviator or aviators at the proper time.

Moreover, the aviator or aviators are obliged to regulate the distributing of oxygen according to the altitude attained, which presents a certain difficulty.

Numerous accidents have demonstrated the disadvantages of apparatus arranged in this way.

The apparatus forming the subject-matter of the present invention is contrived in such a way as to permit of an automatic distribution of oxygen or other gas in predetermined quantities corresponding to the value of the atmospheric pressure.

The present apparatus is characterized essentially by the fact that it responds to variation of altitude, and utilizes the effects of the barometric pressure for the purpose of actuating a gas-distributor.

To this end this distributor is controlled by a series of barometric shells or vacuum chambers placed side by side, the expansion or contraction of which causes the displacement of a slide valve provided with an aperture of progressive depth and breadth, permitting of a variable and predetermined distribution of gas according to the position of the slide valve.

The present invention also relates to the combination of this distributing valve actuated by barometric pressure as aforesaid with a gas-expander of special arrangement and with members for adjusting and controlling the flow of the expanded gas.

By way of example the invention is illustrated in the accompanying drawing, in which:—

Figure 1:
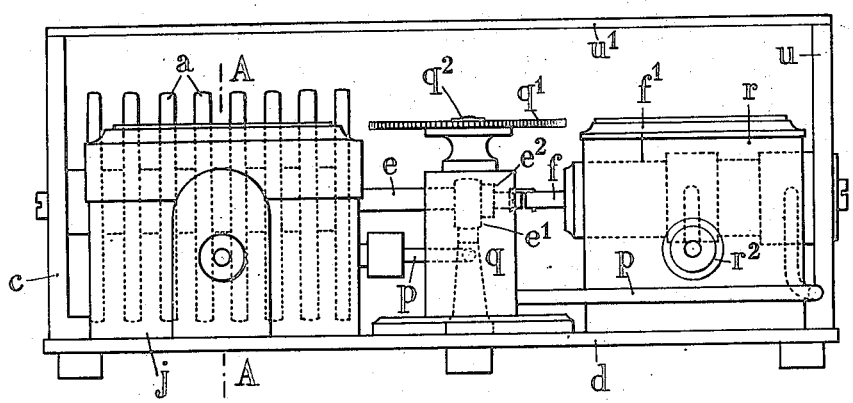
Figure 1 shows in elevation the apparatus as a whole, adapted to distribute expanded oxygen to three persons.

As may be seen in the drawing, the apparatus forming the subject-matter of the present invention comprises a series of barometric shells or vacuum chambers $a$, the faces of which are connected to one another by rings $b$ for the purpose of multiplying the flexions produced by the variations in pressure.

The ring of one of the end chambers of this pressure responsive device is fixed on to a support $c$ mounted on a base $d$. The ring of the chamber located at the other end is formed or connected with a horizontal rod $e$ capable of sliding in a guiding member $e'$ secured to the aforesaid base $d$ and provided with a collar or sleeve $e^2$ serving as a stop when coming into contact with the face of the guiding member aforesaid.

The object of the rod $e$ is to control an oxygen-distributor comprising a sliding member $f$ displaceable in a cylinder $f'$ arranged horizontally and open at one of its ends in order to permit of the sliding member being actuated by or connected to the rod $e$, these two members being in alignment with one another. The oxygen is admitted into the cylinder $f'$ through a passage $g$ and it can pass out through a passage $g'$ by passing through the sliding member $f$. To this end the latter comprises a central passage $h$ the extremity of which, bent at a right angle at $h'$, communicates with a cavity $i$, of decreasing depth and breadth, cut along a generating line of the sliding member, in such a way as to more or less disclose the passage $g'$. The distributing valve arranged in this way operates as follows:—

Figure 2:
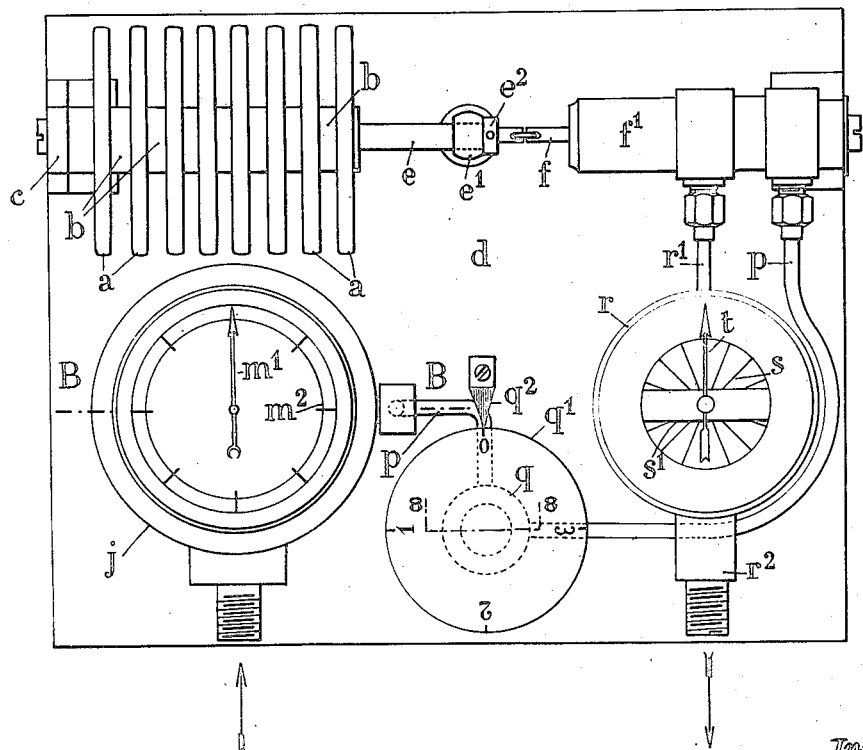
Figure 2 is a corresponding plan.
Figure 3:
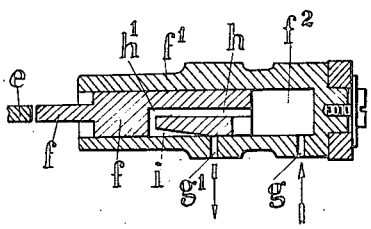
Figure 3 is a longitudinal vertical section of the distributing valve proper.

When the flying machine or balloon has not left the ground, the vacuum chambers $a$ occupy the position shown in Figures 1 and 2, and the sleeve $e^2$ of the rod $e$ is in contact with the guide $e'$. In this position of the vacuum chambers, the sliding member $f$ is in such a position as to completely close the aperture $g'$ for the outlet of the oxygen, which, entering through the passage $g$, fills the chamber $f^2$ of the cylinder $f'$ of the distributor, (Figure 3).

When the aircraft has left the ground, in proportion as it rises the atmospheric pressure decreases, which occasions a progressive expansion of the vacuum chambers $a$ and consequently a displacement of the rod $e$, which pushes back the sliding member $f$ into the cylinder $f'$.

This displacement of the sliding member $f$ has the effect first of all of bringing the extremity of the cavity $i$, and then the deeper and deeper parts of this cavity, over the orifice of the passage $g'$.

It follows that in proportion as the machine rises in the air, quantities of oxygen escaping through the distributing valve become larger and larger.

When the aircraft comes down again the vacuum chambers $a$ progressively contract and the sliding member $f$ is carried forward again by the pull exerted by the rod $e$, in such a way that shallow and shallower parts of the cavity $i$ are in turn brought over the orifice of the outlet passage $g'$, which occasions a progressive diminution in the flow of oxygen, until, the flying machine or balloon having arrived near the ground, the sliding member completely closes the orifice of the gas outlet member.

It will be seen from the above that the apparatus permits of the automatic distribution of predetermined quantities of gas under variable atmospheric pressures.

In other words, when the apparatus is suitably regulated, the passage of gas is regulated or under the control of the responsive device in such wise as to allow a more or less abundant flow of the gas according to the atmospheric pressure, so as to compensate for the varying oxygen content of the atmosphere.

It will be understood that if the distributor is connected to a suitable mask or other apparatus applied to the face of the aviator, the latter will always receive automatically the quantity of oxygen necessary for combating the effects of the lowering of the pressure of the atmosphere, whatever may be the altitude that he reaches.

Nevertheless since the oxygen contained in the reservoir is at too high a pressure to be capable of being utilized directly, it is necessary to expand it suitably before it enters the distributor.

The apparatus forming the subject-matter of the present invention comprises a special expander, a cock for regulating the quantity of expanded gas permitted to pass according as to whether the apparatus is to supply one, two or three persons, and a device for controlling the flow of the expanded gas as it comes from the distributor.

The expander comprises a circular box or chamber $j$ divided into two superposed compartments $j'$ and $j^2$ by a diaphragm $k$.

The upper compartment $j'$ forms a fluid-tight chamber enclosing air at the atmospheric pressure of the place where the apparatus was adjusted, for a purpose which will be indicated further on.

The lower compartment $j^2$, in which the expansion of the gas takes place, communicates on the one hand with the oxygen reservoir by means of passages $l$ and $l'$ formed in the connecting member $l^2$ and through the medium of a passage $l^3$ and a pipe $p$ with the admission passage $g$ of the distributing valve chamber $f'$.

The expansion of the gas is effected in the following manner:—

Figure 4:
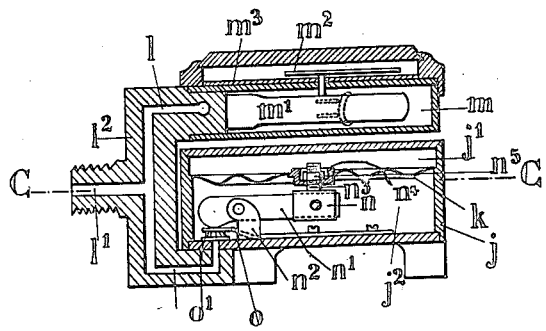
Figures 4 and 5 are two vertical sections of the expander, taken along the lines A—A of Figure 1 and B—B of Figure 2 respectively.
Figure 5:
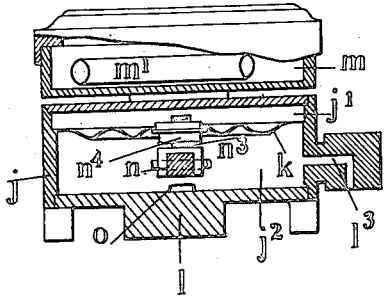
Figure 6:
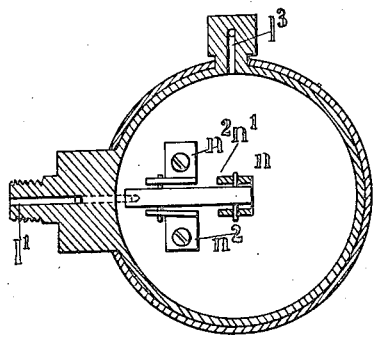
Figure 6 is a horizontal section taken along the line C—C of Figure 4.

At the centre of the diaphragm $k$ is mounted a forked member $n$ in which is pivotally mounted the extremity of a lever $n'$, which is again pivoted at a second point to a support $n^2$ carried by the bottom of the box $j$. The free end of the lever $n'$ is in contact with a spring blade $o$, secured to the bottom of the box $j$ and carries a washer $o'$ capable of being applied to the orifice of the oxygen admission passage $l$, this orifice being placed at a level higher than that of the bottom of the compartment $j^2$, as shown in Figure 4.

This compartment communicates by a passage $l^3$ and a pipe $p$ of suitable dimensions with the admission passage $g$ of the distributor.

When the sliding member $f$ of this distributor is not actuated, and closes the orifice of the passage $g$, oxygen does not enter the expander, the washer of the spring $o$ being applied to the orifice of the passage $l$ by the pressure exerted on this spring by the lever $n'$.

When the sliding member is actuated and gas flows from the distributor, the pressure inside the expander falls, which gives elasticity to the diaphragm $k$, which can then yield.

The oxygen under pressure arriving by the passage $l$ then raises the spring $o$ and enters the compartment $j^2$, until, in consequence of the pressure exerted by this gas on the diaphragm $k$, the latter actuates the lever $n'$, which applies the washer of the spring $o$ to the orifice of the passage $l$.

It will be understood from the above that according to the initial position occupied by the lever $n'$ the quantity of gas admitted into the expander will be greater or less.

In order to enable variations of discharge to be obtained at will, the forked member $n$ is provided with a screw-threaded rod $n^3$ passing through the bottom of a cup $n^4$ fixed to the centre of the diaphragm $k$. This rod receives a nut $n^5$ located in the said cup and bearing on the bottom of the latter.

By screwing up or unscrewing the nut $n^5$ the initial position of the lever $n'$ and consequently the output of the apparatus will be varied.

On the other hand the air contained in the fluidtight chamber $j'$ above the diaphragm $k$ prevents the pressure of the atmosphere from acting directly on the latter, which would have the result, when a change of altitude occurred, of causing a displacement of this diaphragm such that the lever $n'$ would keep the oxygen admission orifice closed and would consequently prevent the apparatus from operating normally. Thus the diaphragm responds to the pressure of the expanded gas in comparison to ordinary atmospheric pressure in such wise as to compensate for variation of the expanded gas from atmospheric pressure by regulating the passage of the gas by means of the valve washer of the spring $o$.

Above the box $j$ is arranged a pressure gauge comprising a fluidtight chamber $m$ in direct and constant communication through the passage $l^3$ with the oxygen reservoir. This chamber $m$ contains a Bourdon tube $m'$ controlling a needle $m^2$ displaceable over a graduated dial $m^3$ for the purpose of indicating at all times the pressure and volume of the gas remaining in the reservoir.

The dial $m^3$ is perfectly visible from the outside, as shown by Figure 2.

Where the present apparatus is designed to supply gas simultaneously to several persons, three for instance, it is necessary for the quantity of gas reaching the distributor to be capable of being varied when the apparatus is only being utilized by one or two persons.

In order to obtain this result a cock $q$ is inserted on the pipe $p$. The plug $q^a$ of this cock is formed with a groove $q^b$ of decreasing depth which allows varying quantities of oxygen to pass according to the position of the plug. The latter is actuated by means of a disc $q'$ which is displaceable beneath a pointer $q^2$ and bears marks corresponding to the necessary discharge for one, two or three persons. The cock also enables the passage for the gas to be completely closed when the mark 0 is brought opposite to the pointer.

The present apparatus is also provided with a device enabling the passage of the gas coming from the distributor to be observed, it being of interest to aviators or aeronauts to know whether the oxygen is flowing properly from the distributor or whether the latter is out of order or obstructed.

The device enabling the passage of the gas to be observed consists of a box $r$ connected by a tube $r'$ to the outlet passage $g'$ of the distributor, and provided with a nozzle $r^2$ to which is fixed the pipe communicating with the mask or masks.

Figure 7:
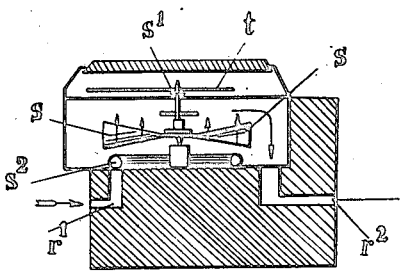
Figure 7 is a vertical section of the device for controlling the flow of the expanded gas.
Figure 8:
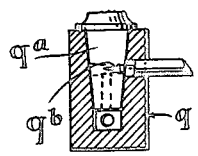
Figure 8 is a detail view in section of the valve for limiting the gas supply to one or more persons, taken on the line 8—8 of Fig. 2.

The box $r$ contains a wheel $s$ provided with vanes mounted on a rotating vertical axis $s'$, which revolves under the action of the gas passing through a semicircular tube $s^2$ pierced with holes at its upper part (Figure 7).

The spindle $s'$ carries a needle $t$ which is displaced with it and revolves in the upper part of the box $r$ so long as the gas is flowing from the distributor. This needle is perfectly visible from the outside, as the drawing shows. By means of this observation device, therefore, the outflow of gas from the automatic regulator proper is visibly indicated.

The whole of the parts constituting the observation device are enclosed in a box $u$ provided with a window $u'$ to enable these parts to be observed and the flow of gas checked.

As has been said above, the present apparatus is more especially intended to supply aviators or aeronauts with variable quantities of oxygen enabling the effects of the decrease in atmospheric pressure to be combated, but it will be quite understood that it is applicable to other uses, in particular for supplying automatically to internal combustion engines mounted on aeroplanes the quantities of gas or air necessary for their satisfactory working whatever altitude may be reached by the aircraft.

While the distribution of gas by the slide valve is predetermined in the sense that the rate of distribution, or volume of flow per unit time, is dependent upon antecedent conditions, the distribution is not predetermined in the sense that the gas is distributed in definite (as contrasted with continuing)

quantities or unit increments of predetermined volume, either to or from the slide valve; to the contrary the distribution of gas, when initiated by the ascent of the aviator to the altitude requiring the amplification of oxygen in his respiratory air supply, is more often steady and continuous, and is only varied in the rate of volume supplied per unit of time, coincident with variations of atmospheric pressure or altitudes attained by him, and the quantity of gas to be supplied to the aviator is only actually predetermined by the capacity of his oxygen tank. Therefore, the term predetermined quantities employed is not used herein as a term of limitation but is used rather to define the regulated manner in which the gas is supplied, whether continuous, intermittent, or otherwise, to the end that the requirements of the aviator, engine, etc., for the gas at any stated altitude or atmospheric pressure may be met and supplied automatically, by means which is influenced by conditions existent at the stated altitude or by the stated atmospheric pressure to supply the gas in the exact or approximate quantity, volume or rate of flow demanded by the aviator, engine, etc., at that particular altitude or atmospheric pressure.

It will be obvious that the device of the present invention may be influenced by any pressures extraneous to the apparatus itself and arising in a static medium and the use thereof is not necessarily limited to atmospheric control but may be utilized wherever distribution of a flowing medium is to be controlled by variations in pressure in another and static medium in which the apparatus is steeped, and extraneous or independent of the particular medium distributed and controlled.

The above arrangements are only given by way of example. The forms, dimensions and devices of detail may be varied according to circumstances without affecting the principle of the invention.

Claims:

1. An automatic regulator for the distribution of predetermined quantities of gas under variable atmospheric pressures at varying altitudes, utilizing the effects of the barometrical pressure for actuating a special gas distributor arranged for allowing a more or less abundant flow of this gas according to the different altitudes.

2. An automatic regulator for the distribution of predetermined quantities of gas under variable atmospheric pressures, comprising a device responsive to variation of atmospheric pressure, and a gas distributor controlled by said responsive device in such wise as to allow a more or less abundant flow of the gas to be so distributed according to the atmospheric pressure.

3. An automatic regulator for the distribution of predetermined quantities of gas at varying altitudes to compensate for the varying oxygen content of the atmosphere, comprising a device responsive to variation of altitude, and a gas distributor controlled by said responsive device in such wise as to allow a more or less abundant flow of the gas to be so distributed according to the altitude.

4. An automatic regulator for the expansion and distribution of predetermined quantities of gas at varying altitudes from a supply under pressure too high for direct use, comprising means responsive to the pressure of the expanded gas in comparison with ordinary atmospheric pressure and to variation of altitude, and means for regulating the passage of the gas to be distributed controlled by said responsive means in such wise as to compensate for variation of the expanded gas from atmospheric pressure and to allow a more or less abundant flow of gas according to the altitude.

5. An automatic regulator for expansion and distribution of predetermined quantities of gas under variable atmospheric pressures from a supply under pressure too high for direct use, comprising a device responsive to variation of atmospheric pressure, a device responsive to the pressure of the expanded gas in comparison with ordinary atmospheric pressure, and means for regulating the passage of gas to be distributed controlled by said devices in such wise as to maintain the pressure of the expanded gas substantially constant and to allow a more or less abundant flow of gas according to the atmospheric pressure.

6. An automatic regulator in accordance with claim 5, in combination with means for visibly indicating the outflow of gas therefrom.

7. An automatic regulator for the distribution of predetermined quantities of gas under variable atmospheric pressures, comprising in combination: barometrical shells connected together, a rod fixed to the last shell, a gas distributor connected to the rod of the shell, a gas controlling and regulating device connected to the distributor, a cock for regulating the quantity of expanded gas entering into the distributor and a device for the control of the expanded gas.

8. An automatic regulator for the distribution of predetermined quantities of gas under variable atmospheric pressures, comprising in combination: barometrical shells connected together, a rod fixed to the last shell, and moving in one direction or the other through the expansion or contraction of the shells, a gas distributor constituted by a cylinder open at one of its ends, a slide valve connected to the rod of the barometrical shells moving in this cylinder, a slot of progressing depth and width communicating with an inner chamber of the cylinder for allowing a variable and predetermined flow of gas according to the position occupied by the slide valve, an outlet passage for the gas issuing from the distributor, a gas controlling and regulating device connected to the distributor, a cock for regulating the quantity of expanded gas entering into the distributor and a device for the control of the expanded gas.

9. An automatic regulator for the distribution of predetermined quantities of gas under variable atmospheric pressures, comprising in combination: barometrical shells connected together, a rod fixed to the last shell, and moving in one direction or the other through the expansion or contraction of the shells, a gas distributor comprising a slide valve connected to the rod of the shells and moving in a cylinder provided with a slot of progressing depth and width for allowing a variable and predetermined flow of gas according to the position occupied by the slide valve, a gas controlling and regulating device connected to a reservoir containing gas under pressure and to the distributor and comprising a diaphragm the expansion of which determines, through the medium of suitable members, the closing of the passage bringing in the gas under pressure when the distributor is not actuated and the contraction of which diaphragm allows the admission of the gas under pressure in the controlling and regulating device when the expanded gas passes through the distributor, a cock for regulating the quantity of expanded gas entering into the distributor and a device for the control of the expanded gas.

10. An automatic regulator for the distribution of predetermined quantities of gas under variable atmospheric pressures, comprising in combination: barometrical shells connected together, a rod fixed to an end shell, and moving in one direction or the other through the expansion or contraction of the shells, a gas distributor comprising a slide valve connected to the rod of the shells and moving in a cylinder provided with a slot of progressing depth and width for allowing a variable and predetermined flow of gas according to the position occupied by the slide valve, a gas controlling and regulating device connected to a reservoir containing gas under pressure and to the distributor and comprising a chamber divided in two compartments by a diaphragm, the lower compartment communicating with the reservoir containing gas under pressure and with the distributor, a lever pivoted at one of its ends to the center of the diaphragm in the lower compartment, a washer for closing the gas inlet orifice provided in the controlling and regulating device, said washer being arranged under the other end of the lever, a spring carrying this washer for determining the raising of the latter and the uncovering of the orifice, a sleeve for the joint of the lever on the diaphragm, a screw threaded rod integral with said sleeve and passing through a cup fixed to the center of the diaphragm, nuts screwed on said rod for allowing to vary the position of the sleeve and consequently that of the lever in order to obtain variations in the outflow of the apparatus, a cock for regulating the quantity of expanded gas entering into the distributor and a device for the control of the expanded gas.

11. An automatic regulator for the distribution of predetermined quantities of gas under variable atmospheric pressures, comprising in combination: barometrical shells connected together, a rod fixed to an end shell, a gas distributor connected to the rod of the shell, a gas controlling and regulating device connected to the distributor, and to a gas reservoir and comprising a chamber divided in two compartments by a diaphragm, a lever pivoted to the center of the diaphragm, in the lower compartment and determining the uncovering or the covering of the orifice bringing in the gas under pressure, means for adjusting the initial position of this lever, a fluid-tight chamber constituted by the upper compartment, containing air at the atmospheric pressure of the place where the apparatus was adjusted for preventing the decrease in atmospheric pressure from acting directly on the diaphragm, a pressure gauge arranged above the controlling and regulating device and connected to the passage bringing in the gas under pressure to the latter for controlling the volume and pressure of the gas remaining in the reservoir, a cock for regulating the quantity of expanded gas entering into the distributor and device for the control of the expanded gas.

12. An automatic regulator for the distribution of predetermined quantities of gas under variable atmospheric pressures, comprising in combination: barometrical shells connected together, a rod fixed to an end shell, a gas distributor connected to the rod of the shell, a gas controlling and regulating device connected to the distributor, and to a gas reservoir, a cock arranged on the conduit connecting the controlling and regulating device to the gas distributor, the key of this cock having a groove of decreasing depth for the passage of variable quantities of gas according to the position of the key, a graduated disc integral with said key and moving in front of a pointer for indicating the quantity of gas passing through the cock, and device for the control of the expanded gas.

13. An automatic regulator for the distribution of predetermined quantities of gas under variable atmospheric pressures, comprising in combination: barometrical shells connected together, a rod fixed to an end shell, a gas distributor connected to the rod of the shell, a gas controlling and regulating device connected to the distributor, and to a reservoir containing gas under pressure, a cock for regulating the quantity of expanded gas entering into the distributor, a device for the control of the passage of the gas coming from the distributor and constituted by a casing connected to the distributor, a wheel with blades arranged in the said casing and mounted on a rotary shaft, a semi-circular tube perforated for the passage of the expanded gas which causes the said wheel to rotate, an outer needle mounted on the shaft of the latter and rotating with said shaft as long as the gas coming from the distributor passes through the box containing the wheel provided with blades.

14. An automatic regulator for the distribution of predetermined quantities of gas under variable atmospheric pressures, comprising a device responsive to variation of atmospheric pressure, and a gas distributor controlled by said responsive device in such wise as to allow a more or less abundant flow of the gas to be so distributed according to the atmospheric pressure, in combination with means for visibly indicating the outflow of gas from said distributor.

15. An automatic regulator for the distribution of a flowing medium under variable pressures of an extraneous static medium corresponding to variations of atmospheric pressure, including means to control the flowing medium, and means responsive to such pressure variations in the extraneous medium for causing the controlling means to vary the distribution of the flowing medium coincident with pressure variations of the extraneous medium.

16. An automatic regulator for the distribution of a flowing respiration supporting medium under variable pressures of an extraneous static medium corresponding to variations of atmospheric pressure, including means to control the volume flow of the flowing medium, and means responsive to such pressure variations in the extraneous medium for causing the controlling means to vary the flow of the flowing medium coincident with pressure variations of the extraneous medium and in inverse ratio.

17. An automatic regulator for the distribution of oxygen under variable pressures of the atmosphere, including means to control the rate of flow of the oxygen, and means responsive to atmospheric pressure variations for causing the controlling means to increase the rate of flow of the oxygen coincident with a decrease in pressure of the atmosphere and vice versa to cause a more or less abundant flowing of the oxygen in inverse ratio to the varying pressure of the atmosphere.

18. An automatic regulator for the distribution of a flowing medium from a source of supply under variable pressures of an extraneous static medium having pressure limits at greater variance with the mean pressure of the source of supply of the flowing medium, means to control the rate of flow of the flowing medium, means to supply the flowing medium to the controlling means at a pressure at lesser variance with the pressure limits of the extraneous medium, and means responsive to variations in pressure of the extraneous medium to cause the controlling means to vary the rate of flow of the flowing medium coincidently with pressure variations of the extraneous medium.

19. An automatic regulator for the distribution of a flowing medium from a high pressure source of supply under variable pressures of a low pressure extraneous static medium, including means to control the rate of flow of the flowing medium, means to supply the flowing medium to the controlling means at a low pressure in excess of the maximum pressure of the extraneous medium, and means responsive to pressure variations of the extraneous medium to cause the controlling means to vary the rate of flow of the flowing medium coincidently with pressure variations of the extraneous medium.

20. An automatic regulator to control the supply of respiration supporting gas to aviators at high altitudes, including a controlling means capable when operated to vary the flow of the gas, and means responsive to variations of atmospheric pressure incidental to altitude changes to operate the controlling means whereby the aviator may be supplied with gas in varying continuing quantities to supply his needs at different altitudes.

21. An automatic regulator to control the supply of respiration supporting gas to aviators at high altitudes from a source of high pressure gas supply including a controlling means capable, when operated to vary the volume flow of the gas to the aviator, means to automatically control the passage of gas from the source of supply to said controlling means so as to cause the latter to supply the gas to the aviator at a pressure slightly in excess of maximum atmospheric pressure, and means responsive to variations of atmospheric pressure incidental to altitude changes, whereby the aviator is supplied with gas in varying and continuous or intermittent quantities requisite to supply his needs at different altitudes attained.

22. An automatic regulator for the distribution of a flowing meduim under variable pressures of a static, extraneous medium, including means adjustable to variously fix the volume flow of the flowing medium, an automatic controlling means to receive the flowing medium from the adjustable means to vary the flow of the flowing medium within limits fixed by the adjustable means, and means responsive to pressure variations of the extraneous medium to cause the controlling means to operate in the manner aforesaid.

23. An automatic regulator to control the supply of respirationl supporting gas to aviators at high altitudes including means adjustable to variously fix the volume flow according to the number of aviators to be supplied, means to control the volume flow to the aviators within limits fixed by the adjustable means, and means responsive to variations in atmospheric pressure incidental to altiude changes to cause the controlling means to supply gas to the aviators in volume or quantities requisite to their needs at the different altitudes attained.

24. An automatic regulator for the distribution of a flowing medium from a source of high pressure supply under variable pressures of a static extraneous medium, including a controlling means capable, when operated to vary the volume flow of the flowing medium, means to supply the latter to the controlling means at a pressure slightly in excess of the maximum pressure of the extraneous medium, means to variously fix the volume flow of the flowing medium whereby the controlling means may vary the rate of flow only within any fixed limits appointed by the last mentioned means, and means responsive to pressure variations of the extraneous medium to operate the controlling means in the manner stated.

The foregoing specification of "An automatic regulator for the distribution of predetermined quantities of gas under variable atmospheric pressures," signed by me this twenty-second day of October, 1917.

JACQUES CHARLES JOSEPH de LESTANG-PARADE.

Witnesses:
CHAS. P. PRESSLY,
FRANÇOIS WEBER.